United States Patent Office
3,457,225
Patented July 22, 1969

3,457,225
PROCESS FOR PREPARING POLYURETHANE COMPOSITIONS FROM POLYOXYALKYLENE DERIVATIVES OF P,P'-ISOPROPYLIDENEDIPHENOL
Adolfas Damusis, Detroit, Mich., assignor to Wyandotte Chemicals Corporation, Wyandotte, Mich., a corporation of Michigan
No Drawing. Filed July 18, 1966, Ser. No. 565,703
Int. Cl. C08g 22/06
U.S. Cl. 260—47                    8 Claims

ABSTRACT OF THE DISCLOSURE

A polyurethane composition is prepared by (1) reacting a polyisocyanate with a polyoxyalkylene derivative of bisphenol A, (2) reacting the resulting isocyanate adduct with a polyhydric polyether or aliphatic diol to prepare linearly extended functional polymer segments, and (3) crosslinking or chain extending the linearly extended functional polymer segments with polyfunctional hydroxyl-, amine-, or isocyanate-terminated adducts.

---

The present invention relates to novel polymers for use in polyurethane sealing and coating compositions.

Many coating and sealing compositions containing polyurethanes as their principal film-forming constituent have been made. These compositions have been particularly useful because they have had one or more excellent properties, such as, chemical inertness, high tensile strength, flexibility, extensibility and adhesion to a wide variety of substrates such as wood, metal, and masonry. However, none of the prior art polyurethanes has resulted in products exhibiting a combination of outstanding properties.

It is an object of this invention to provide polyurethane compositions having high hardness, good flexibility, and excellent mar-proofness. A further object of this invention is to provide polyurethane compositions having an increase in physical properties, such as tensile and split tear strength, and having improved resistance to discoloration. It is another object of this invention to provide polyurethanes soluble in conventional solvents for easy application. It is still another object to provide polyurethane compositions that lend themselves to spray-coating operations. Still another object of this invention is to provide polyurethane coatings that are dry to the touch upon evaporation of the solvents.

It has been found that by using polyester or polyoxyalkylene derivatives of bisphenol A in polyurethane coating and sealing compositions, linear and star-type polyurethane polymers may be produced that exhibit excellent physical properties. As used throughout the specification, the term "linear" will be used when referring to a polymer that may be represented by Y—Y; the term "star-type" will be used when referring to a polymer that may be represented by

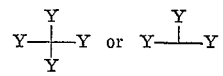

where Y represents the functional terminal group and may be either hydroxyl-amine or isocyanate-terminated. The star-type polymers of this invention are branched or inner-connected to form tri- or tetradimensional networks. The formation of the star-type polymer from the linear polymer segments containing aliphatic diols in their backbone is particularly advantageous since the trend of the linear polymer segments containing the aliphatic diols to crystallize in solution to form a pseudogel is inhibited by the formation of the star-type polymer.

Bisphenol A is the commercial name for the compound variously named p,p'-isopropylidenediphenol or p,p'-dihydroxy-diphenyl-dimethyl methane or 2,2'-bis diphenol propane or dimethyldiphenolmethane. For convenience, the term "bisphenol A" will be used throughout this patent application.

In general, the polyurethane compositions of this invention are made so that relatively long polymer segments having polyoxyalkylene derivatives of bisphenol A in the backbone of the polymer chain are included in the polyurethane polymers. This has been found to give polyurethane coating and sealing compositions many outstanding physical properties. The polyurethane compositions of this invention are made by:

(A) Reacting a polyoxyalkylene derivative of bisphenol A with an organic diisocyanate to form an isocyanate-terminated adduct and extending the adduct with a polyhydric compound, preferably a diol to form linearly extended functional polymer segments (I), or (B) Reacting a polyoxyalkylene derivative of bisphenol A with an adduct of an organic diisocyanate and a polyoxyalkylene diol to form linearly extended functional polymer segments (I) and then either crosslinking the linear segments (I) or capping the linear segments (I) with multifunctional end groups.

The linear functional polymer segments (I) are hydroxy-functional or isocyanate-functional and may be further reacted with selected crosslinking agents to crosslink the linear polymer segments (I) to form a star-type polymer (II). The star-type polymer (II) may be either hydroxy-functional, amine-functional, or isocyanate-functional. If the star-type polymer (II) has isocyanate-functional groups, it may be used as a sealing composition on porous substrates since the moisture in the air will provide the necessary cure. If the star-type polymer (II) is hydroxy- or amine-functional, it may be further reacted with a polyisocyanate or an isocyanate adduct to give a coating material exhibiting a combination of outstanding properties.

The linear-functional polymer segments (I) may be made in a variety of ways. For example:

(A) A polyoxyalkylene derivative of bisphenol A is reacted with an excess of an organic diisocyanate to form isocyanate-terminated linear polymer segments (I).

(B) An excess of a polyoxyalkylene derivative of bisphenol A is reacted with an organic diisocyanate to form hydroxy-terminated linear polymer segments (I).

(C) An excess of an isocyanate adduct of a polyoxyalkylene derivative of bisphenol A (or a mixture thereof with a glycol isocyanate adduct) is extended with an aliphatic diol to form difunctional isocyanate-terminated linear polymer segments (I).

(D) An isocyanate adduct of a polyoxyalkylene derivative of bisphenol A (or a mixture thereof with a glycol isocyanate adduct) is extended with an excess of aliphatic diol to form difunctional hydroxy-terminated linear polymer segments (I).

(E) A polyoxyalkylene derivative of bisphenol A is reacted with a dicarboxylic acid or epsilon caprolactone to form a hydroxy-terminated polyester. The polyester can then be extended with an organic diisocyanate to form isocyanate-terminated or hydroxy-terminated linear polymer segments (I).

(F) Isocyanate-terminated polyoxyalkylene adducts may be extended with polyoxyalkylene derivatives of bisphenol A to form isocyanate-terminated or hydroxy-terminated linear polymer segments (I).

The star-type polymers are made from the above-described linear functional polymer segments (I). For example:

(A) 3½ to 6 moles of linear isocyante-terminated segments (I) may be crosslinked with one mole of triol to form an isocyanate-terminated star-type polymer.

(B) 3 to 4 moles of linear hydroxy-terminated polymer segments (I) may be crosslinked with one mole of an isocyanate triol adduct to form hydroxy-terminated star-type polymers.

The linear functional polymer segments (I) may also be reacted with polyfunctional isocyanate-terminated adducts or polyfunctional hydroxy-terminated adducts to prepare linear segments (I) having multifunctional end groups. It is preferred to react one mole of polymer segments (I) with from about 2 to 2.2 moles of polyfunctional isocyanate- or hydroxy-terminated adducts. For example:

(A) One mole of linear hydroxy-terminated polymer segments (I) may be capped with 2 moles of a trifunctional isocyanate-terminated adduct to form isocyanate-terminated polymers that may be represented by the following structure:

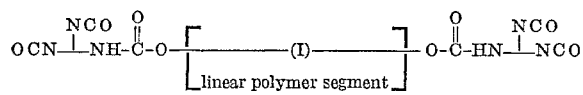

(B) One mole of linear isocyanate-terminated polymer segments (I) may be capped with 2 moles of a trifunctional polyol to give a hydroxy-terminated polymer that may be represented by the structure shown below:

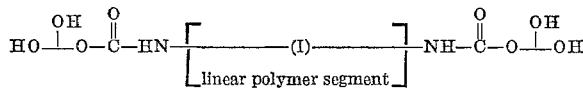

It is also contemplated that one mole of the polymer segments (I) may be capped with from 2 to 2.2 moles of tetra or higher functionality isocyanate- or hydroxyl-terminated adducts. Examples of such adducts are the isocyanate- or hydroxyl-terminated adducts of (1) pentaerythritol and sorbitol, and (2) polyoxyalkylene derivatives of pentaerythritol and sorbitol.

The hydroxy-functional or isocyanate-functional linear polymer segments (I) may contain either polyester or polyether chains. For example, bisphenol A may be reacted with an alkylene oxide to give a polyoxyalkylene derivative of bisphenol A. The polyoxyalkylene polyether derivatives of bisphenol A may be prepared by any of the various conventional methods of synthesis. These include the following typical reaction:

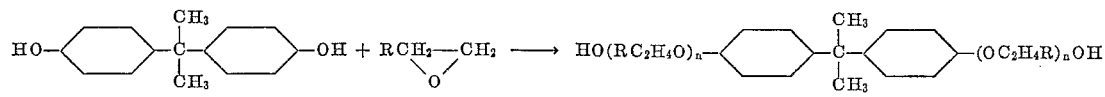

wherein R is hydrogen or an alkyl group containing from 1 to 3 carbon atoms and $n$ is from 2 to 12. Alkylene oxides containing from 2 to 4 carbon atoms may be used in making the polyoxyalkylene derivative of bisphenol A. In the preferred embodiments, propylene oxide, tetramethylene oxide, or butylene oxide are condensed with bisphenol A to form the polyether derivatives. The molecular weights of the polyoxyalkylene derivatives of bisphenol A that may be used within the scope of this invention range from about 300 to 1,500. Bisphenol A may also be extended with tetrahydrofuran and a wide variety of lactones such as epsilon caprolactone. The preferred bisphenol A derivatives are oxypropylene derivatives of bisphenol A having a molecular weight of from about 500 to about 1,200. The molecular weights of the polyether polyols, as referred to herein, were calculated from the corresponding hydroxyl number according to the formula:

Molecular weight=

$$\frac{56.1 \times 1,000 \times \text{number of hydroxyl groups}}{\text{hydroxyl number}}$$

The hydroxyl number of the corresponding polyether polyol was calculated as described by ASTM–1638.

The polyoxyalkylene derivative of bisphenol A may be reacted further with a dicarboxylic acid to give linear polymer segments (I) containing polyester chains. Any dicarboxylic acid containing from 2 to 10 carbon atoms may be reacted with the polyalkalene derivative of bisphenol A to form the polyester derivatives. The preferred dicarboxylic acids are oxalic, malonic, succinic, glutaric, adipic, pimelic, suberic, azelaic, and sebacic.

Any of a wide variety of diisocyanates may be used in the preparation of the isocyanate adducts. Aromatic diisocyanates, such as 2,4-tolylene diisocyanate, 4,4'-methylene-bis (phenyl isocyanate), 1,5-naphthalene diisocyanate, and m-phenylene diisocyanate, are preferred. Aliphatic compounds, such as hexamethylene diisocyanate and tetramethylene diisocyanate and the alicyclic compounds such as 1,4-cyclohexylene diisocyanate, are also operable.

Any polyhydric polyether having a molecular weight of at least about 200 and preferably not more than about 10,000 may be used. These polyhydric polyethers are used for several purposes within the scope of this invention. These include (1) the use of the polyhydric polyethers in the preparation of isocyanate-terminated adducts, (2) as a linear chain-extending agent in chain extending the adduct to form the linearly extended functional polymer segments (I), and (3) as a tri- or tetrafunctional agent in crosslinking the linear functional polymer segments (I) and in crosslinking the isocyanate-terminated adducts of polyoxyalkylene derivatives of bisphenol A. Examples of polyhydric polyethers which may be used are the lower polyalkylene ether glycols, such as polyoxypropylene glycols, polyoxytetramethylene glycols, and polyoxybutylene glycols, such as are obtained, for example, from 1,2-butylene oxide, 1,3-butylene oxide, 1,4-butylene oxide, ethylene oxide, and propylene oxide. Polyhydric polyethers with a molecular weight of approximately at least 300, preferably not greater than about 3,000, are preferred. It is also within the scope of the invention to use polyethers containing different alkylene oxide groups within the same polyether molecule; for example, ethylene oxide and propylene oxide or ethylene oxide and butylene oxide. Branched polyhydric polyethers, such as those obtained by reacting alkylene oxides with polyhydric alcohols such as trimethylolpropane, glycerol, 1,2,6-hexanetriol, pentaerythritol, and sorbitol, are also used.

The preferred polyhydric polyethers are the polypropylene glycols having molecular weight from about 400 to 1,200 and oxypropylene derivatives of trimethylolpropane having molecular weights from about 300 to 2,000

The isocyanate-terminated adducts used in the preparation of the compositions of this invention are the reaction products of a diisocyanate and any of the polyhydric polyethers mentioned above. For example, tolylene diisocyanate is reacted with a polyoxyalkylene derivative of bisphenol A in any conventional method to result in an isocyanate adduct of a polyoxyalkylene derivative of bisphenol A. It is necessary in the practice of this invention that an isocyanate adduct of a polyoxyalkylene derivative of bisphenol A be used in the composition. However, an isocyanate adduct of any of the above-mentioned polyhydric polyethers can be used in admixture with the isocyanate adduct of a polyoxyalkylene derivative of bisphenol A. The mixture should contain at least 20% by weight of the mixture of an isocyanate adduct of a polyovyalkylene derivative of bisphenol A. The rest of the mixture may be isocyanate adducts of any of the polyhydric polyethers mentioned above. Thus, the isocyanate adduct mixture may contain from about 20 to 100% of an isocyanate adduct of a polyoxyalkylene derivative of bisphenol A and from 0 to 80% of an isocyanate adduct of another polyhydric polyether. It is preferred to use (as the other isocyanate adduct) isocyanate adducts of polyoxypropylene glycol, polyoxytetramethylene glycol, or polyoxypropylene derivatives of trimethylolpropane. The preferred embodiments of this invention employ a mixture of the polyisocyanate adducts that contain from about 30% to about 70% by weight of said mixture of an isocyanate adduct of a polyoxypropylene derivative of bisphenol A and from about 70% to about 30% by weight of an isocyanate adduct of polyoxypropylene glycol or polyoxytetramethylene glycol.

Aliphatic diols may also be used as linear extending agents in making the linearly extended functional polymer segments (I). Any aliphatic diol, such as ethanediol, propanediol, butanediol, pentanediol, hexanediol, and the like, may be used. The preferred aliphatic diols are 1,4-butane diol and 1,6-hexane diol. Enough aliphatic diol should be used to insure that all the isocyanate adducts have been linearly extended. Therefore, from about 0.75 to 1.33 moles of aliphatic diol should be used for each mole of isocyanate adduct.

The crosslinking agents are preferably tri- or tetra-functional materials. The preferred crosslinkers for hydroxyl-terminated polymer segments (I) are the isocyanate adducts of polyether triols and tetraols. These crosslinkers are prepared by reacting the alkylene oxide with a trihydric or tetrahydric alkane and then reacting the product thereof with an aliphatic or aromatic diisocyanate. The preferred triol crosslinkers are isocyanate adducts of polypropylene oxide derivatives of trimethylolpropane and 1,2,6-hexanetriol having a molecular weight from about 300 to 2,000. The preferred tetraol crosslinkers are isocyanate adducts of polypropylene oxide derivatives of pentaerythritol having molecular weights from about 400 to about 3,000. The crosslinkers for isocyanate-terminated polymer segments (I) and the isocyanate adducts of polyoxyalkylene derivatives of bisphenol A are the ethylene oxide and propylene oxide derivatives of a trihydric or a tetrahydric alkane. The preferred hydroxy-terminated crosslinkers are the propylene oxide derivatives of trimethylolpropane, pentaerythritol, and 1,2,6-hexanetriol. The crosslinking reactions require from about 0.5 to 1.0 equivalent of crosslinking agent per mole of adduct to be crosslinked. It is preferred to use from about 0.75 to 0.95 equivalent of crosslinking agents.

Because of the relatively high viscosity of the intermediate polymers and final products, it is necessary to use generous amounts of solvents in the reactions. The amount of solvent used will depend upon the desired solids content of the intermediates and final products. Generally, enough solvent is used to give a solids content of from about 35 to 70% solids in the final product. Aromatic or oxygenated hydrocarbon solvents having boiling points of from about 70 to 145° C. may be used.

It is preferred, in lacquer type applications where a fast dry-to-touch is required, to use solvents near the lower end of the boiling point range since they will evaporate more rapidly. Preferred solvents include toluene, ethyl acetate, propyl acetate, butyl acetate, amyl acetate, 2-ethoxy-ethyl-acetate, and 2,4-pentane-dione. The solvents may be added at any necessary or convenient time during processing of the polymers.

Application of the coatings is by conventional dip, brush, knife, and certain coating methods, and eventually by the spray method. Their viscosity may be adjusted by dilution with appropriate solvents. The one-package coating is more convenient to use, since the measurement and blending of a second component is not required.

It is an advantage of this invention that heat is not required for a curing process after the coating is applied. Heating to a higher temperature is frequently impossible, due to various reasons such as the shape and dimensions or due to the adverse effects of high temperatures on the object which preclude placing the object in an oven.

Examples 1 to 10 will further illustrate this invention. The table at the end of the examples shows the physical properties of the compositions.

EXAMPLE 1

| | Moles | Parts by Wt. | Wt. Percent |
|---|---|---|---|
| Reactants: | | | |
| Isocyanate adduct of polyoxypropylene glycol and tolylene diisocyanate, (M.W. 1,533, 70% solids) | 21 | 32,193 | 20.0 |
| Isocyanate adduct of an oxypropylene derivative of bisphenol A and tolylene diisocyanate, (M.W. 1,260, 70% solids) | 21 | 26,460 | 16.4 |
| 1,6-hexane diol, (M.W. 118) | 45 | 5,310 | 3.3 |
| Isocyanate adduct of an oxypropylene derivative of trimethylolpropane, and tolylene diisocyanate (M.W. 2,100, 100% solids) | 0.95 | 1,995 | 1.2 |
| Total Reactants | | 65,958 | 40.9 |
| Solvents Used: | | | |
| Toluene (addition to 70% solids) | | 2,276 | 1.4 |
| Toluene (addition to 60% solids) | | 11,038 | 6.9 |
| Toluene (addition to 50% solids) | | 17,412 | 10.8 |
| Ethyl acetate (addition to 30% solids) | | 64,434 | 40.0 |
| Total Reactants and Solvents | | 161,118 | 100.0 |

Procedure

Step 1.—Preparation of hydroxyl-functional linear polymer segments (I).

See Example 4, infra, for preparation of isocyanate adduct starting material.

The isocyanate adduct of polyoxypropylene glycol and tolylene diisocyanate (21 moles) and the isocyanate adduct of the polyoxypropylene derivative of bisphenol A (21 moles) are charged into a reactor equipped with a nitrogen blanket, a stirrer, a thermometer, a condenser, and an Ultra Viscoson for continuous viscosity measurement. Forty-five moles of 1,6-hexane diol are added with continuous stirring to the mixture of isocyanate adducts. The mixture was diluted with 2,276 parts by weight of toluene to 70% solids. The temperature of the reaction mixture was raised to 85° C., and after one hour of stirring at this temperature, 0.01% by weight of dibutyltindilaurate catalyst was added to the reaction mixture. The reaction mixture was then stirred at 85° C., from about one to two hours longer, until a complete disappearance of free isocyanate groups and the viscosity increased up to about 900 cps. at 85° C. The completion of the reaction was determined by titration of the free isocyanate. No traces of free NCO are allowable. Free hydroxyl content was about 0.13%. The reaction mixture was then diluted to 60% solids by the addition of 11,038 parts by weight of toluene.

Step 2.—Preparation of the star-type hydroxyl-functional polymer (II).

When no free isocyanate was found in the product of Step 1, 0.95 mole (1,995 parts by weight) of an isocyanate adduct of an oxypropylene derivative of trimethylolpropane, M.W. 2,100, was added to the product in the reaction vessel. The contents of the reactor were then heated to 85° C. and about 0.01% by weight of stannous octoate was added to the reaction mixture. The heating was continued for one hour or longer, until a complete disappearance of free isocyanate groups or an increase in viscosity up to 800 to 900 cps. at 85° C. is achieved. A small sample was removed from the reaction mixture and 64,434 parts by weight of ethyl acetate was added to dilute to 30% solids.

Theoretical molecular weight of the star-type polymer (II) was approximately 48,300.

The theoretical calculated percent of hydroxyl at 100% solids is 0.11%. The actual percent hydroxyl found was 0.15%.

EXAMPLE 1a

| Reactants | Moles | Parts by Wt. | Wt. Percent |
|---|---|---|---|
| Hydroxyl-terminated star-type polymer product from Step 2 of Example 1, (M.W. 161,118 at 30% solids) | 1 | 161,118 | 95.5 |
| Isocyanate adduct of an oxypropylene derivative of bisphenol A, and tolylene diisocyanate, (M.W. 1,260, at 70% solids) | 6 | 7,560 | 4.5 |
| Total Reactants | | 168,678 | 100.0 |

Procedure

Blend the two components thoroughly.

The pot life of this two-component blend was about 14 days at 50° C. and about 21 days at room temperature (25° C.).

EXAMPLE 1b

| Reactants | Moles | Parts by Wt. | Wt. Percent |
|---|---|---|---|
| Hydroxyl-terminated star-type polymer product from Step 2 of Example 1, (M.W. 161,118 at 30% solids) | 1 | 161,118 | 93.5 |
| Isocyanate adduct of an oxypropylene derivative of trimethylolpropane, tolylene diisocyanate, (M.W. 1,850 at 70% solids) | 6 | 11,100 | 6.5 |
| Total Reactants | | 172,218 | 100.0 |

Procedure

Same as Example 1a.

The pot life of this two-component blend was about 10 days at 50° C. and from about 21 to 28 days at room temperature (25° C.).

EXAMPLE 2

| Reactants | Moles | Parts by Wt. | Wt. Percent |
|---|---|---|---|
| Isocyanate adduct of oxytetramethylene polyether glycol and tolylene diisocyanate, (M.W. 1,600 at 70% solids) | 30 | 48,000 | 21.4 |
| Isocyanate adduct of an oxypropylene derivative of bisphenol A and tolylene diisocyanate, (M.W. 1,260 at 70% solids) | 30 | 37,800 | 16.9 |
| 1,4-butane diol, (M.W. 90) | 63 | 5,670 | 2.5 |
| Isocyanate adduct of an oxypropylene derivative of trimethylolpropane and tolylene diisocyanate, (M.W. 1,600 at 80% solids) | 0.95 | 1,520 | 0.7 |
| Total Reactants | | 92,990 | 41.5 |
| Solvents Used: | | | |
| Toluene (addition to 60% solids) | | 18,080 | 8.1 |
| Toluene (addition to 50% solids) | | 22,822 | 10.2 |
| Ethyl acetate (addition to 30% solids) | | 90,083 | 40.2 |
| Total Reactants and Solvents | | 223,975 | 100.0 |

Procedure

*Step 1.*—Preparation of hydroxyl-functional linear polymer segments (I). The procedure was similar to that described in Step 1 of Example 1.

The theoretical free hydroxyl groups in product at 70% solids was 0.11%, while actual found hydroxyl group content was 0.14%.

*Step 2.*—Preparation of star-type hydroxyl-functional polymer (II).

When no traces of free isocyanate were found in the reaction mixture from Step 1, 0.95 mole of an isocyanate adduct of an oxypropylene derivative of trimethylolpropane and tolylene diisocyanate was added. The reaction mixture was diluted to 50% solids with 22,822 parts of toluene and heated to 85° with continuous stirring. Stannous octoate in the amount of 0.01% by weight was added and the reactants were further heated, for about one hour or longer, until a complete disappearance of free isocyanate or an increase in viscosity up to about 800 to 900 cps. at 85° C. was achieved.

A sample was taken from the reaction mixture for hydroxyl determination and the contents of the reactor was diluted to 30% solids with ethyl acetate.

The theoretical molecular weight of the star-type polymer (II) produced in this example was approximately 63,000 at 100% solids.

The theoretical calculated hydroxyl content was 0.08% on a solids basis. The actual hydroxyl content was found to be 0.10% on a solids basis.

EXAMPLE 2a

| Reactants | Moles | Parts by Wt. | Wt. Percent |
|---|---|---|---|
| Hydroxyl-terminated star-type polymer produced from Step 2 of Example 2 (M.W. 223,975 at 30% solids) | 1 | 223,975 | 96.7 |
| Isocyanate adduct of an oxypropylene derivative of pentaerythritol and tolylene diisocyanate (M.W. 1,850 at 70% solids) | 4 | 7,400 | 3.3 |
| Total Reactants | | 231,375 | 100.0 |

Procedure

The two components were blended thoroughly. The pot life of this two-component blend was about 6 days at 50° C. and about 15 days at room temperature (25° C.).

EXAMPLE 3.—POLYURETHANE COATING FROM LINEAR POLYESTERS CONTAINING BISPHENOL A IN POLYESTER CHAIN

| Reactants: | Moles | Parts by Wt. | Wt. Percent |
|---|---|---|---|
| Oxypropylene derivative of bisphenol A (M.W. 675) | 15 | 10,125 | 30.1 |
| Adipic acid (M.W. 174) | 12 | 2,088 | 6.2 |
| Isocyanate adduct of an oxypropylene derivative of pentaerythritol and tolylene diisocyanate (M.W. 1,851 at 70% solids) | 0.95 | 1,758 | 5.2 |
| Total Reactants | | 13,971 | 41.5 |
| Solvents Used: | | | |
| Toluene (addition to 70% solids) | | 5,234 | 15.7 |
| Toluene (addition to 40% solids) | | 14,404 | 42.8 |
| Total Reactants and Solvents | | 33,609 | 100.0 |

Procedure

*Step 1.*—Preparation of linear polyester polymer segments (I).

The adipic acid and the oxypropylene derivative of bisphenol A was charged to a stainless steel reaction vessel equipped with a dry nitrogen blanket, a stirrer, a thermometer, and an Ultra Viscoson for a continuous measurement of viscosity. The contents was heated up to 140° C. and the water from the condensation reaction was distilled over into a trap. The azeotropic removal of the water of condensation was carried out by the addition of a small amount of toluene. After 6 to 8 hours, the condensation reaction was completed and the temperature was then raised to 180° C. in order to remove residual traces of moisture and solvent. The temperature of the linear polyester was reduced to 80° C. and 5,234 parts by weight of toluene was added to reduce the contents to 70% solids.

*Step 2.*—Crosslinking to form star-type polymers (II).

The isocyanate adduct of the oxypropylene derivative of pentaerythritol and tolylene diisocyanate was added to the linear polymer prepared in Step 1. The mixture was heated for about one hour at about 80 to 90° C. and 0.01% by weight of dibutyltin dilaurate catalyst was added. After about one additional hour at about 90° C., the crosslinking was substantially complete. The reaction was conducted at the highest possible solids content, and after the completion of the reaction, the product was reduced to 40% solids by the addition of toluene.

EXAMPLE 3a

| Reactants | Moles | Parts by Wt. | Wt. Percent |
|---|---|---|---|
| Hydroxyl-terminated star-type polymer product from Step 2 of Example 3 (M.W. 33,609 at 40% solids) | 1 | 33,609 | 81.6 |
| Isocyanate adduct of an oxypropylene derivative of bisphenol A and tolylene diisocyanate (M.W. 1,260 at 70% solids) | 6 | 7,560 | 18.4 |
| Total Reactants | | 41,169 | 100.0 |

Procedure

The two components were thoroughly blended. The pot life of this two-component blend was about 5 days at 50° C. and about 15 days at room temperature (25° C.).

EXAMPLE 4.—NONFUNCTIONAL STAR-TYPE POLYMER

|  | Moles | Parts by Wt. | Wt. Percent |
|---|---|---|---|
| Reactants: |  |  |  |
| Isocyanate adduct of an oxypropylene derivative of bisphenol A and tolylene diisocyanate (M.W. 878) | 20 | 17,560 | 17.3 |
| Isocyanate adduct of a polyoxypropylene glycol and tolylene diisocyanate (M.W. 693) | 20 | 19,260 | 18.9 |
| 1,4-butane diol (M.W. 90) | 36 | 3,240 | 3.2 |
| Oxypropylene derivative of trimethylol propane (M.W. 760) | 1 | 760 | 0.7 |
| Isobutanol (M.W. 74) | 10 | 740 | 0.7 |
| Total Reactants |  | 41,560 | 40.8 |
| Solvents Used: |  |  |  |
| Toluene (addition to 70% solids) |  | 7,526 | 7.4 |
| Do |  | 8,254 | 8.1 |
| Do |  | 1,389 | 1.4 |
| Toluene (addition to 50% solids) |  | 11,449 | 11.3 |
| Butyl acetate (addition to 50% solids) |  | 11,449 | 11.3 |
| Ethyl acetate (addition to 40% solids) |  | 20,023 | 19.7 |
| Total Reactants and Solvents |  | 101,650 | 100.0 |

Procedure

*Step 1.*—Preparation of isocyanate adducts.

(A) The isocyanate adduct of the oxypropylene derivative of bisphenol A was prepared by reacting (1) 20 moles of an oxypropylene derivative of bisphenol A, M.W. 530, with
(2) 40 moles of tolylene diisocyanate at 60 to 70° C. The adduct was then reduced to 70% solids by the addition of 7,526 parts by weight toluene.

(B) The isocyanate adduct of polyoxypropylene glycol was prepared by reacting (1) 20 moles of a polyoxypropylene glycol, M.W. 615, with
(2) 40 moles of tolylene diisocyanate at 60 to 70° C. The adduct was then reduced to 70% solids with 8,254 parts by weight toluene.

*Step 2.*—Extending the isocyanate adducts to form linear functional polymer segments (I).

Forty moles of the adducts (A and B) prepared in Step 1 were mixed with 36 moles of 1,4-butane diol. The extension was completed by stirring at about 80 to 90° C. for about two hours. The extension product was reduced to 70% solids by the addition of 1,389 parts by weight toluene. The free isocyanate content was 0.58% at 70% solids.

*Step 3.*—Crosslinking. To the product from Step 2, 760 parts by weight of a crosslinker was added. The crosslinker was an oxypropylene derivative of trimethylolpropane with a molecular weight of 760. The crosslinker and product from Step 2 were caused to react by heating with about 0.01% dibutyltin dilaurate catalyst for about one and one-half hours at about 90° C. The contents were then reduced to 50% solids with 22,898 parts by weight toluene and then further reduced with 20,023 parts by weight of ethyl acetate to 40% solids. Just before the final product was packaged, 740 parts by weight of isobutanol was blended into the final product to terminate any free isocyanate groups. The nonfunctional polymer produced in this example is used primarily as a vehicle for pigmented bases for use in urethane formulations.

EXAMPLE 5.—NONFUNCTIONAL STAR-TYPE POLYMER

|  | Moles | Parts by Wt. | Wt. Percent |
|---|---|---|---|
| Reactants: |  |  |  |
| Polyoxypropylene glycol (M.W. 625) | 32 | 20,000 | 15.3 |
| Methylene bis (4-phenylisocyanate) (M.W. 250) | 64 | 16,000 | 12.2 |
| Oxypropylene derivative of bisphenol A (M.W. 535) | 28 | 14,980 | 11.5 |
| Oxypropylene derivative of trimethylolpropane (M.W. 1,260) | 1 | 1,260 | 0.9 |
| Methyl Cellosolve (M.W. 76) | 18.4 | 1,400 | 1.1 |
| Total Reactants |  | 53,640 | 41.0 |
| Solvents Used: |  |  |  |
| Toluene (addition to 70% solids) |  | 15,428 | 11.8 |
| Do |  | 6,420 | 4.9 |
| Toluene (addition to 60% solids) |  | 12,978 | 10.0 |
| Toluene (addition to 50% solids) |  | 17,414 | 13.4 |
| Ethyl acetate (addition to 40% solids) |  | 24,720 | 18.9 |
| Total Reactants and Solvents |  | 130,600 | 100.0 |

Procedure

*Step 1.*—Preparation of linear polymer. An isocyanate adduct was prepared by reacting methylene bis (4-phenylisocyanate) with the polyoxypropylene glycol. The oxypropylene derivative of bisphenol A was then added to the isocyanate adduct and 0.01% of dibutyltin dilaurate was added to speed up the linear extension step. The reaction was carried out at about 80° C. for about two hours. The free isocyanate content was determined to control the completion of the reaction. Toluene addition was made at appropriate times to maintain a 70% solids basis.

*Step 2.*—Crosslinking. One mole of an oxypropylene derivative of trimethylolpropane crosslinker was added to the product of Step 1 and about 0.01% of dibutyltin dilaurate catalyst was added on solids basis. The blend of materials was stirred for about 2 hours at about 80 to 90° C. to complete the crosslinking reaction. The contents are reduced to 60% solids by the addition of toluene.

Before packaging, the final product was further reduced to 40% solids by the addition of ethyl acetate and toluene. Methyl Cellosolve, 1,400 parts by weight, was added to terminate any free isocyanate groups present. The nonfunctional polymer of this example may be used as a vehicle for pigmented bases in polyurethane formulations.

EXAMPLE 6

|  | Moles | Parts by Wt. | Wt. Percent |
|---|---|---|---|
| Reactants: |  |  |  |
| Polyoxytetramethylene glycol (M.W. 1,000) | 9 | 9,000 | 15.4 |
| Tolylene diisocyanate (M.W. 174) | 18 | 3,132 | 5.4 |
| Oxypropylene derivative of bisphenol A (M.W. 520) | 9 | 4,680 | 8.0 |
| Tolylene diisocyanate (M.W. 174) | 18 | 3,132 | 5.4 |
| 1,4 butane diol (M.W. 90) | 21 | 1,890 | 3.2 |
| Isocyanate adduct of an oxypropylene derivative of trimethylolpropane and tolylene diisocyanate (M.W. 1,602) | 0.95 | 1,522 | 2.6 |
| Total Reactants |  | 23,356 | 40.0 |
| Solvents Used: |  |  |  |
| Toluene (addition to 80% solids) |  | 4,986 | 8.6 |
| Do |  | 473 | 0.8 |
| Toluene (addition to 60% solids) |  | 8,924 | 15.3 |
| Do |  | 1,014 | 1.7 |
| Butyl acetate (addition to 50% solids) |  | 7,959 | 13.6 |
| Ethyl acetate (addition to 40% solids) |  | 11,678 | 20.0 |
| Total Reactants and Solvents |  | 58,390 | 100.0 |

Procedure

The preparation procedure is essentially the same as that of Example 2 above.

EXAMPLE 7

| Reactants: | Moles | Parts by Wt. | Wt. Percent |
|---|---|---|---|
| Oxypropylene derivative of bisphenol A (M.W. 675) | 20 | 13,500 | 29.8 |
| Tolylene diisocyanate (TDI) (M.W. 174) | 24 | 4,176 | 9.3 |
| Oxypropylene derivative of trimethylolpropane (M.W. 420) | 1 | 420 | 0.9 |
| Total Reactants | | 18,096 | 40.0 |
| Solvents Used: | | | |
| Dry toluene (addition to 80% solids) | | 4,419 | 9.8 |
| Dry toluene (addition to 70% solids) | | 3,823 | 8.4 |
| Dry ethyl acetate (addition to 60% solids) | | 3,823 | 8.4 |
| Dry toluene (addition to 60% solids) | | 7,540 | 16.7 |
| Dry ethyl acetate (addition to 40% solids) | | 6,200 | 13.7 |
| Dry 2,4-pentanedione (addition to 40% solids) | | 1,360 | 3.0 |
| Total Reactants and Solvents | | 45,261 | 100.0 |

Procedure

*Step 1.*—Preparation of isocyanate-terminated linear polymer segments (I). Anhydrous solvents are used in this procedure and special precautions are observed in order to eliminate the absorption of moisture from the atmosphere.

The oxypropylene derivative of bisphenol A and the tolylene diisocyanate was charged into a reactor. A nitrogen blanket was maintained in the reactor. The ingredients were reacted at 90 to 100° C., for two hours or longer, until the free isocyanate content approached the theoretical free isocyanate content of approximately 1.9% on a solids basis. When the viscosity became too high, 4,419 parts by weight of dry toluene were added to the reaction mixture. If the theoretical free isocyanate content of 1.9% on solids basis cannot be obtained, a minute amount of a tin catalyst can be added. For example, dibutyltin dilaurate in amounts of from about 0.005 to 0.01% on a solids basis may be added.

*Step 2.*—Crosslinking. To the reaction mixture from Step 1, 420 parts by weight of the oxypropylene derivative of trimethylolpropane were added and reacted under the nitrogen blanket at about 90 to 100° C., for two hours or longer, until the free isocyanate content approached the theoretical 1.16% on 100% solids basis or 0.7% isocyanate content at 60% solids concentration. The reaction mixture in the reaction vessel was reduced to 60% solids by adding 3,823 parts by weight of dry toluene and 3,823 parts by weight of dry ethyl acetate. A catalyst, dibutyltin dilaurate, in the amount of 0.005 to 0.01% by weight on a solids basis was added to activate the crosslinking reaction.

*Step 3.*—Solvent addition. After the reaction was completed, the contents of the reactor were reduced with 7,540 parts by weight of dry toluene, 6,200 parts by weight of dry ethyl acetate, and 1,360 parts by weight of dry 2,4-pentanedione down to a 40% solids.

Stability of solution:[1]
- Theoretical _____Percent__ 0.53
- Actual, just after preparation _____do____ 0.60
- After one day's aging _____do____ 0.56
- After one week's aging _____do____ 0.56

Viscosity, cps. at 25° C.:
- Initial _____cps__ 130
- 7 days _____cps__ 270
- 14 days _____cps__ 420
- 21 days _____cps__ 680
- 28 days _____cps__ 1,180

[1] Isocyanate content of 40% solution.

The theoretical average equivalent weight for each isocyanate group was 3,619.

The theoretical free isocyanate on 100% solids was 1.16%.

EXAMPLE 7a.—AMINE-TERMINATED STAR-TYPE POLYMER IN POLYURETHANE COATING COMPOSITION

| Reactants: | Moles | Parts by Wt. | Wt. Percent |
|---|---|---|---|
| Isocyanate-terminated polymer of Example 7 (M.W. 45,261 at 40% solids) | 1 | 45,261 | 78.2 |
| 2-methyl piperazine (M.W. 100) | 5 | 500 | 0.9 |
| Isocyanate adduct of an oxypropylene derivative of trimethylolpropane and tolylene diisocyanate (M.W. 1,566 at 60% solids) | 3 | 4,698 | 8.1 |
| Total Reactants | | 50,459 | 87.2 |
| Solvent Used: | | | |
| Dry toluene (addition to 35% solids) | | 7,394 | 12.8 |
| Total Reactants and Solvents | | 57,853 | 100.0 |

Procedure

The 2-methyl piperazine was dissolved in the dry toluene and added to the isocyanate-terminated polymer from Example 7 with vigorous stirring at room temperature or lower. The amine-terminated polymer was then blended with an isocyanate adduct of an oxypropylene derivative of trimethylolpropane and tolylene diisocyanate in dry toluene at 60% solids.

EXAMPLE 8

| Reactants: | Moles | Parts by Wt. | Wt. Percent |
|---|---|---|---|
| Polyoxypropylene derivative of bisphenol A (M.W. 635) | 10 | 6,350 | 12.9 |
| Tolylene diisocyanate (TDI) (M.W. 174) | 20 | 3,480 | 7.1 |
| Polyoxypropylene derivative of bisphenol A (M.W. 525) | 11 | 5,775 | 11.8 |
| Adduct of an oxypropylene derivative of trimethylolpropane and tolylene diisocyanate (M.W. 1,590) | 1.1 | 1,749 | 3.6 |
| Tolylene diisocyanate (M.W. 174) | 1 | 174 | 0.4 |
| Total Reactants | | 17,528 | 35.8 |
| Solvents Used: | | | |
| Dry toluene (addition to 75% solids) | | 3,277 | 6.7 |
| Do | | 1,915 | 3.9 |
| Dry toluene (addition to 60% solids) | | 5,238 | 10.6 |
| Do | | 582 | 1.2 |
| Dry ethyl acetate (addition to 35% solids) | | 20,547 | 41.8 |
| Total Reactants and Solvents | | 49,097 | 100.0 |

Procedure

*Step 1.*—Preparation of polyoxypropylene bisphenol A=TDI adduct. Anhydrous solvents were used in this procedure and special precautions were observed in order to eliminate the absorption of moisture from the atmosphere.

Ten moles of a polyoxypropylene derivative of bisphenol A was placed in a reaction vessel. Twenty moles of TDI were added to the bisphenol A derivative, and the mixture of the derivative and TDI was stirred until the exothermic reaction ceased. The reactants were then heated to about 70° C. and held at that temperature for about one to two hours. The reactants were then reduced to 75% solids with 3,277 parts by weight of dry toluene. The free isocyanate content was approximately 6.4%.

*Step 2.*—Preparation of hydroxyl-terminated linear prepolymer. Eleven moles (5,775 parts by weight) of an oxypropylene derivative of bisphenol A were reduced to 75% solids with 1,925 parts by weight of dry toluene, and the mixture was added to the reaction product of Step 1. The contents of the reaction vessel were then heated up to 90° C. for about one hour. Then dibutyltin dilaurate catalyst in the amount of 0.01% (1.6 parts by weight) based on total solids was added straight to the reaction vessel and stirred at 90° C. for one hour. The contents of the vessel were analyzed for free isocyanate. If traces of free isocyanate are present, another aliquot of catalyst (1.6 parts by weight) may be added to the reaction mixture. To reduce the contents to 60% solids, 5,238 parts by weight of dry toluene were added to the vessel. The polymer was then checked for free hydroxyl content. About 0.13% of free hydroxyls were found at 60% solids.

The viscosity at room temperature (25° C.) was about 12,000 cps. at 60% solids.

*Step 3.*—Capping of the hydroxyl-terminated linear polymer with isocyanate end groups. One mole of the linear hydroxyl-terminated polymer, product from Step 2 (26,000 parts by weight), one and one-tenth moles of an adduct of an oxypropylene derivative of trimethylolpropane and tolylene diisocyanate (1,749 parts by weight), and one mole of tolylene diisocyanate (174 parts by weight) were blended together. Five-hundred eighty-two parts by weight of dry toluene were added to reduce solids content to 60%. The blend was heated at about 90° C. for about one and one-half hours. The free isocyanate content was about 0.46%.

The polymer was then reduced to 35% solids by adding 20,547 parts by weight of dry ethyl acetate.

Solution properties:
    Viscosity at 25° C. (cps.) _____ 900
    Stability at room temperature _____ Over 6 months
    Calculated molecular weight _____ 17,178

EXAMPLE 9

| | Moles | Parts by Wt. | Wt. Percent |
|---|---|---|---|
| Reactants: | | | |
| Oxypropylene derivative of bisphenol A (M.W. 612) | 20 | 12,240 | 29.2 |
| Tolylene diisocyanate (TDI) (M.W. 174) | 24 | 4,176 | 9.9 |
| Oxypropylene derivative of trimethylolpropane (M.W. 750) | 1 | 750 | 1.8 |
| Total Reactants | | 17,166 | 40.9 |
| Solvents Used: | | | |
| Dry toluene (addition to 80% solids) | | 4,117 | 9.9 |
| Dry toluene (addition to 70% solids) | | 2,942 | 7.0 |
| Dry toluene (addition to 60% solids) | | 3,921 | 9.4 |
| Dry ethyl acetate (addition to 40% solids) | | 13,282 | 31.8 |
| Dry pentanedione (1% of total weight) | | 443 | 1.0 |
| Total Reactants and Solvents | | 41,811 | 100.0 |

The preparation procedure was essentially the same as Example 1 above. Anhydrous solvents were used in this procedure and special precautions were observed in order to eliminate any absorption of moisture from the atmosphere.

Stability of resin solution:[1]
    Theoretical _____Percent__ 0.51
    Actual, just after preparation _____do____ 0.69
    After one day's aging _____do____ 0.62
    After one week's aging _____do____ 0.60
Viscosity, cps. at 25° C.:
    Initial [2] _____ 136
    7 days _____ 205
    14 days _____ 306
    28 days _____ 560

[1] Isocyanate content of the 40% solution.
[2] Inhibited with 2,4-pentanedione.

The approximate average equivalent weight for each isocyanate group was 8,865 at 40% solids.

The free isocyanate content was 1.27% at 100% solids.

EXAMPLE 10

| | Moles | Parts by Wt. | Wt. Percent |
|---|---|---|---|
| Reactants: | | | |
| Oxypropylene derivative of bisphenol A (M.W. 537) | 24 | 12,888 | 28.6 |
| 1,6-hexamethylene diisocyanate (M.W. 168) | 28 | 4,704 | 10.4 |
| Oxypropylene derivative of trimethylolpropane (M.W. 432) | 1 | 432 | 1.0 |
| Total Reactants | | 18,024 | 40.0 |
| Solvents Used: | | | |
| Dry toluene (addition to 80% solids) | | 4,536 | 10.1 |
| Dry toluene (addition to 70% solids) | | 3,188 | 7.1 |
| Dry toluene (addition to 60% solids) | | 4,292 | 9.5 |
| Dry ethyl acetate (addition to 40% solids) | | 14,570 | 32.3 |
| Dry pentanedione (1% on total weight) | | 450 | 1.0 |
| Total Reactants and Solvents | | 45,060 | 100.0 |

The procedure was essentially the same as the procedure of Example 1 above. In Step 2, the reaction was set at a temperature of about 100 to 110° C. for about two hours. Specially dried solvents were used and all the precautions were observed to avoid the absorption of moisture from the atmosphere.

Stability of solution:[1]
    Theoretical _____Percent__ 0.46
    Actual, just after preparation _____do____ 0.52
    After one day's aging _____do____ 0.50
    After one week's aging _____do____ 0.49
Viscosity, cps. at 25° C.:
    Initial _____ 408
    7 days _____ 546
    14 days _____ 604

[1] Isocyanate content of the 40% solution.

The approximate average equivalent weight for each isocyanate group is 9,013 at 40% solids.

TABLE.—PHYSICAL PROPERTIES OF CURED FILM 0.003″ THICK

| Ex. | Tensile Strength, p.s.i. | 100% Modulus, p.s.i. | Elongation, Percent | Split Tear, p.i. | Sward Hardness | Rate of Discoloration[1] |
|---|---|---|---|---|---|---|
| 1 | 4,100 | 1,260 | 210 | 84 | 28 | 5.8 |
| 1a | 5,600 | 2,611 | 282 | 97 | 50 | 3.8 |
| 1b | 6,851 | 3,189 | 268 | 76 | | |
| 2 | 5,120 | 2,840 | 265 | 67 | 20 | 4.4 |
| 2a | 6,260 | 2,720 | 320 | 92 | 58 | 3.2 |
| 3 | 3,420 | 1,200 | 184 | 86 | 50 | |
| 3a | 5,200 | 1,640 | 246 | 104 | 62 | 4.6 |
| 4 | 3,500 | 1,050 | 180 | 94 | 52 | 5.8 |
| 5 | 3,800 | 680 | 390 | 115 | 48 | 5.1 |
| 6 | 5,600 | 1,080 | 480 | 220 | 48 | |
| 7 | 5,316 | 2,428 | 280 | 73 | 66 | |
| 7a | 5,160 | 1,860 | 320 | 86 | 60 | |
| 8 | 7,400 | 1,450 | 140 | 80 | 66 | |
| 9 | 5,200 | 1,713 | 318 | 156 | 56 | |
| 10 | 3,600 | 980 | 180 | 104 | 48 | |

[1] Determined on Hunter reflectometer taking the average of three readings obtained through blue, green, and amber filters.

What is claimed is:

1. A process for the preparation of a polyurethane composition containing polyoxyalkylene derivatives of p,p′isopropylidenediphenol in the polymer chain comprising the steps of
  (A) reacting an organic polyisocyanate with a polyether polyol selected from the group consisting of
    (1) polyoxyalkylene derivatives of p,p′-isopropylidenediphenol having a molecular in the range of from about 300 to 1,500 and
    (2) a mixture of a polyoxyalkylene derivative of p,p′-isopropylidenediphenol with a polyoxyalkylene glycol having a molecular weight of at least 200, at least 20% by weight of said mixture being the polyoxyalkylene derivative of p,p′-isopropylidenediphenol to prepare an isocyanate adduct;
  (B) reacting said adduct with a polyoxyalkylene ether glycol having a molecular weight of at least 200 or an aliphatic diol to prepare linearly extended functional polymer segments (I); and
  (C) reacting said segments (I) with from about 0.5 to 1.0 equivalent per mole of segments (I) of a polyfunctional cross-linking agent selected from the group consisting of
    (1) polyoxypropylene derivatives of trimethylolpropane,
    (2) polyoxypropylene derivatives of pentaerythritol,
    (3) polyoxypropylene derivatives of 1,2,6-hexane triol, and
    (4) tolylene dissocyanate adducts of polyoxypropylene derivatives of trimethylolpropane, pentaerythritol, or 1,2,6-hexane triol.

2. A process for the preparation of a polyurethane composition containing polyoxypropylene derivatives of p,p′-isopropylidenediphenol in the polymer chain comprising the steps of
  (A) reacting a polyisocyanate selected from the group consisting of (1) tolylene diisocyanate,
(2) 1,6-hexamethylene diisocyanate, and
(3) methylene bis(4-phenylisocyanate)
with a polyether polyol selected from the group consisting of
(1) polyoxypropylene derivatives of p,p'-isopropylidenediphenol, having a molecular weight in the range of from about 300 to 1,500, and
(2) mixtures of polyoxypropylene derivatives of p,p'-isopropylidenediphenol, having a molecular weight in the range of from about 300 to 1,500 with polyoxypropylene glycol or polyoxytetramethylene glycol at least 20% by weight of said mixtures being the polyoxyalkylene derivative of p,p'-isopropylidenediphenol to prepare an isocyanate adduct;
(B) reacting said isocyanate adduct with a diol selected from the group consisting of
(1) 1,4-butane diol, and
(2) 1,6-hexane diol
to prepare linearly extended functional polymer segments (I); and
(C) crosslinking said linearly extended functional polymer segments (I) with from about 0.5 to 1.0 equivalent per mole of segments (I) of a crosslinking agent selected from the group consisting of
(1) polyoxypropylene derivatives of trimethylolpropane,
(2) polyoxypropylene derivatives of pentaerythritol,
(3) polyoxypropylene derivative of 1,2,6-hexanetriol, and
(4) tolylene diisocyanate adducts of polyoxypropylene derivatives of trimethylolpropane, pentaerythritol, and 1,2,6-hexanetriol.

3. The process of claim 2 wherein said mixture of polyisocyanate adduct of polyoxypropylene derivative of p,p'-isopropylidenediphenol and polyisocyanate adduct of polyoxypropylene glycol contains from about 30% to 70% of said polyisocyanate adduct of polyoxypropylene derivative of p,p'-isopropylidenediphenol.

4. The process of claim 2 wherein said mixture of polyisocyanate adduct of polyoxypropylene derivative of p,p'-isopropylidenediphenol and polyisocyanate adduct of polyoxytetramethylene glycol contains from about 30% to 70% of said polyoxypropylene derivative of p,p'-isopropylidenediphenol.

5. The process for the preparation of a polyurethane composition containing polyoxypropylene derivatives of p,p'-isopropylidenediphenol in the polymer chain comprising the steps of
(A) reacting a polyoxypropylene derivative of p,p'-isopropylidenediphenol having a molecular weight in the range of from about 300 to 1,500 with a dicarboxylic acid containing from 2 to 10 carbon atoms to prepare a linear polyester; and
(B) crosslinking said linear polyester with a crosslinking agent selected from the group consisting of
(1) tolylene diisocyanate adduct of a polyoxypropylene derivative of trimethylolpropane,
(2) tolylene diisocyanate adduct of a polyoxypropylene derivative of pentaerythritol, and
(3) tolyene diisocyanate adduct of a polyoxypropylene derivative of 1,2,6-hexanetriol.

6. The process of claim 5 wherein said dicarboxylic acid is selected from the group consisting of
(A) oxalic,
(B) malonic,
(C) succinic,
(D) glutaric,
(E) adipic,
(F) pimelic,
(G) suberic,
(H) azelaic, and
(I) sebacic,
and the polyoxypropylene derivative of p,p'-isopropylidenediphenol has a molecular weight of from about 500 to about 1,200.

7. The process for preparation of a polyurethane composition containing polyoxyalkylene derivatives of p,p'-isopropylidenediphenol in the polymer chain comprising the steps of
(A) reacting a polyoxyalkylene derivative of p,p'-isopropylidenediphenol having a molecular weight in the range of from about 300 to 1,500 with a polyisocyanate selected from the group consisting of
(1) tolylene diisocyanate,
(2) 1,6-hexamethylene diisocyanate, and
(3) methylene bis(4-phenylisocyanate)
to prepare linearly extended functional polymer segments (I), and
(B) crosslinking said polymer segments (I) by reacting with from about 0.5 to 1.0 equivalent per mole of segments (I) of
a crosslinking agent selected from the group consisting of
(1) polyoxyalkylene derivatives of trimethylolpropane,
(2) polyoxyalkylene derivatives of pentaerythritol,
(3) polyoxyalkylene derivatives of 1,2,6-hexanetriol, and
(4) tolylene diisocyanate adducts of polyoxyalkylene derivatives of trimethylolpropane, pentaerythritol, or 1,2,6-hexanetriol.

8. The process of claim 7 wherein the polyoxyalkylene is polyoxypropylene and the molecular weight of the polyoxypropylene derivative of p,p'-isopropylidenediphenol is from about 500 to about 1,200; wherein the molecular weight of the polyoxypropylene derivative of trimethylolpropane is from about 300 to 2,000; wherein the molecular weight of the polyoxypropylene derivative of pentaerythritol is from about 400 to about 3,000; and wherein the molecular weight of the polyoxypropylene derivative of 1,2,6-hexanetriol is from about 300 to 2,000.

References Cited

UNITED STATES PATENTS

| 2,843,568 | 7/1958 | Benning et al. | 260—77.5 |
| 3,201,136 | 8/1965 | Harrison et al. | 277—198 |
| 3,216,973 | 11/1965 | Britain | 260—77.5 |
| 3,304,286 | 2/1967 | Altscher et al. | 260—47 |

FOREIGN PATENTS

| 849,405 | 9/1960 | Great Britain. |
| 894,924 | 4/1962 | Great Britain. |

WILLIAM H. SHORT, Primary Examiner

L. L. LEE, Assistant Examiner

U.S. Cl. X.R.

260—75, 77.5